United States Patent [19]

Naito

[11] Patent Number: 4,624,331

[45] Date of Patent: Nov. 25, 1986

[54] WEIGHT SENSOR WITH VIBRATION ERROR CORRECTION

[75] Inventor: Kazufumi Naito, Ohtsu, Japan

[73] Assignee: Kabushiki Kaisha Ishida Koki Seisakusho, Kyoto, Japan

[21] Appl. No.: 687,174

[22] Filed: Dec. 28, 1984

[30] Foreign Application Priority Data

Dec. 28, 1983 [JP] Japan ................................ 58-251706
Aug. 1, 1984 [JP] Japan ................................ 59-162694

[51] Int. Cl.$^4$ ........................ G01G 23/10; G01G 19/00
[52] U.S. Cl. ...................................... 177/185; 177/1; 177/200
[58] Field of Search .................. 177/1, 25, 185, 200, 177/DIG. 12

[56] References Cited

U.S. PATENT DOCUMENTS

| | | |
|---|---|---|
| 3,322,222 | 5/1967 | Bauer . |
| 3,670,833 | 6/1972 | Tomohiko et al. ................ 177/1 |
| 4,212,361 | 7/1980 | Stocker ............................ 177/200 |
| 4,298,081 | 11/1981 | Blodgett . |
| 4,396,080 | 8/1983 | Dee ................................. 177/185 |

FOREIGN PATENT DOCUMENTS

| | | | |
|---|---|---|---|
| 122796 | 10/1984 | European Pat. Off. ............ | 177/185 |
| 2418451 | 9/1979 | France . | |
| 2104667 | 3/1983 | United Kingdom . | |

Primary Examiner—Harold Broome
Assistant Examiner—Patrick W. Foster
Attorney, Agent, or Firm—Staas & Halsey

[57] ABSTRACT

A load sensor includes a scale cell for producing an output signal corresponding to the weight of an article, and a dummy cell, provided near the scale cell, for producing a noise signal output ascribable to floor vibration. A correcting circuit extracts a signal proportional to a DC component contained in the output signal of the scale cell and, on the basis of the extracted signal, corrects the output signal of the dummy cell to the noise level of a floor vibration component of the scale cell. The corrected dummy cell noise signal is added in opposite-phase relation to the scale cell output signal, so that the floor vibration noise contained in the scale cell output signal is cancelled out by the corrected noise signal of the dummy cell.

4 Claims, 7 Drawing Figures

WEIGHT SENSOR WITH VIBRATION ERROR CORRECTION

BACKGROUND OF THE INVENTION

This invention relates to a weight sensor and, more particularly, to a weight sensor capable of effectively eliminating low-frequency noise.

A weight sensor finds use in, e.g., a combinatorial weighing apparatus.

A combinatorial weighing apparatus operates by supplying a plurality of weighing machines with articles to be weighed, computing combinations based on weight values obtained from the weighing machines, selecting a combination giving a total combined weight value equal or closest to a target weight, and discharging the articles solely from those weighing machines corresponding to the selected combination, thereby providing a batch of weighed articles of a weight equal or closest to the target weight.

Such a combinatorial weighing apparatus will now be described in brief with reference to FIG. 1. The apparatus includes weight sensors $M_1, M_2 \ldots M_n$ for sensing the weight of articles introduced into the respective weighing hoppers belonging to n weighing machines. Each weight sensor produces a weight signal, namely an analog value indicative of the weight sensed thereby. The weight signals from these weight sensors $M_1, M_2 \ldots M_n$ are applied as multiple input signals $S_1, S_2 \ldots S_n$ to a multiplexer 11. The multiplexer 11, which is composed of analog switches or the like, responds to a control signal $S_c$ from a computation controller 20, described below, by selectively applying the weight signals $S_1, S_2 \ldots S_n$ as a weight data signal $S_o$ to a buffer circuit 12 sequentially in a time series. The buffer circuit 12 delivers the weight data signal $S_o$ received from the multiplexer 11 to a sample/hold circuit 13 upon subjecting the signal to an impedance conversion. The sample/hold circuit 13 repeatedly samples and holds the weight data signal $S_o$ subjected to the impedance conversion by the buffer circuit 12 and delivers the weight data signal to a buffer circuit 14. The latter subjects the signal to an impedance conversion, producing an analog weight data signal $S_p$ which is delivered to an analog-digital converter (A/D converter) 15. The latter digitizes the analog weight data signal $S_p$ to produce a digital output $S_d$ which is applied to the aforementioned computation controller 20. The latter is composed of a microcomputer and includes a processor 21 for performing combinatorial processing, a read-only memory (ROM) 22 storing a control program for combinatorial processing, and a random-access memory (RAM) 23 for storing the weight data as well as the results of processing performed by the processor 21. The computation controller 20 computes combinations on the basis of the weight data, selects a combination giving a total combined weight value equal or closest to a target weight, and delivers a drive signal to drive units $H_1, H_2 \ldots H_n$ of respective weighing hoppers belonging to those weighing machines which correspond to the selected combination.

In a weighing apparatus relying upon electronic circuitry of the above-described kind, each of the weight sensors $M_1$-$M_n$ makes use of a scale cell comprising strain gauges which exhibit a change in resistance resulting from strain caused by the load of the articles being weighed, and a load-sensitive element on which the strain gauges are bonded. Since a weight sensor of such construction exhibits excellent detection sensitivity, there are situations where the weight sensor produces an erroneous weight signal which may be brought about by floor vibration caused by environmental conditions at the site of installation.

A technique for cancelling out a weighing error caused by such floor vibration is disclosed in the specification of Japanese Patent Publication No. 53-5823. As shown in FIG. 2, this example of the prior-art sensor includes a dummy cell DC provided in the vicinity of a scale cell SC to produce a noise signal ascribable to floor vibration, and an adder ADD the output of which is the output level of the scale cell SC. On the basis of the output level, the noise level included in the output signal of the dummy cell DC is made to agree with the noise level of the floor vibration noise included in the output signal of the scale cell SC. Then, the noise signal from the dummy cell DC and the output signal of the scale cell SC, (the noise levels of which are now in agreement) are added in opposite-phase relation by the adder ADD, thereby eliminating the floor vibration noise contained in the output signal of the scale cell SC. Such feedback control with respect to the noise level of the dummy cell DC is carried out for a specific reason. Namely, since the noise level of the floor vibration noise included in the output signal of the scale cell SC, varies in dependence upon the load of the articles acting upon the weight sensor, the noise level of the dummy cell DC must be made to change as a function of the noise level of the scale cell SC, for otherwise the noise levels of the two cells could not be made to agree at all times. This is the reason for feedback control. When such control is carried out, however, there is a pronounced decline in step response when an article to be weighed is applied to the weight sensor. Accordingly, feedback control cannot be applied to a high-speed weighing operation, as is performed by a combinatorial weighing apparatus. Another problem is that there is a decline in the reliability of the weighing apparatus in cases where a steady deviation or offset develops in the feedback circuitry, the reason being that such a deviation manifests itself as a weighing error.

SUMMARY OF THE INVENTION

An object of the present invention is to provide a weight sensor capable of improving the response of an apparatus in which floor vibration noise incorporated in the output signal of a scale sensor is eliminated through use of a noise signal produced by a dummy cell.

According to the present invention, the foregoing object is attained by providing a weight sensor a characterizing feature of which is a feed-forward circuit provided in place of the above-described feedback circuit of the prior art. The weight sensor of the present invention comprises a scale cell for producing an output signal corresponding to the weight of an article to be weighed, a dummy cell provided in the vicinity of the scale cell for producing a noise signal output ascribable to floor vibration, a correcting circuit for extracting a signal proportional to a DC component contained in the output signal of the scale cell and for correcting, on the basis of the extracted signal, the output signal of the dummy cell to the noise level of a floor vibration component of the scale cell, and an adder for adding, in opposite-phase relation, the noise signal output of the dummy cell, which noise signal output has been corrected by the correcting circuit, and the output signal of the scale cell.

In accordance with the invention, the correcting circuit comprises first gain adjusting means for establishing agreement between a noise level of the dummy cell and a noise level contained in the output signal of the scale cell in the absence of the article to be weighed, adding means for adding, in opposite phase relation, the adjusted noise level of the dummy cell and the output signal of the scale cell to produce, as an output signal, a DC component contained in the output signal of the scale cell, multiplying means for multiplying the output signal of the adding means and the noise signal of the dummy cell, and second gain adjusting means for bringing an output level of the multiplying means into agreement with the noise level of the scale cell.

Further, according to the invention, the correcting circuit comprises a multiple-stage comparator having, as an input, a signal proportional to a DC component contained in the output signal of the scale cell, and signal extracting means having a first input terminal to which is applied the noise signal of the dummy cell, a second input terminal to which is connected a gain adjusting resistor including a feedback resistance the level of which is changed over by the multiple-stage comparator in dependence upon the weight of the article to be weighed, and an output side from which there is obtained a corrected noise signal.

In the weight sensor of the present invention, the floor vibration noise contained in the output signal of the scale cell and the noise signal from the dummy cell are matched by the feed-forward mechanism, thereby quickening step response when the article to be weighed is applied to the weight sensor. The weight sensor of the invention is therefore applicable to a combinatorial weighing apparatus which is characterized by a high-speed weighing operation. Moreover, using the feed-forward mechanism assures that the DC component contained in the output signal of the scale cell will remain substantially unaffected. As a result, the weight sensor will not develop a weighing error, so that a weighing apparatus using the weight sensor will feature improved reliability. Further, since the weight sensor of the invention is capable of effectively eliminating low-frequency vibration noise, it is permissible to raise the cut-off frequency of a low-pass filter for reducing noise other than floor vibration noise. This makes it possible to realize weighing featuring a very quick response.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A brief discussion of the principle of the present invention will be had before turning to a preferred embodiment thereof.

Though the frequency characteristics of a scale cell and dummy cell are never in perfect agreement, it is known that the noise levels of the two cells resemble each other in a substantially parallel state within a frequency region which is sufficiently low in comparison with the natural frequencies of the cells (i.e., a region in which the frequency characteristic is not more than $-40$ db/dec). In this low-frequency region, the noise level of the scale cell varies in proportion to the output level (particularly the level of the DC component) of the scale cell when the amplitude of floor vibration is constant. Specifically, in the absence of an article to be weighed, let the DC level of the scale cell be $V_0$, and let the noise level be $\Delta V_{S0}$. Then, assume that the DC level of the scale cell changes to $V_1$ owing to the weight of an article when the article is applied to the scale cell. The noise level $\Delta V_{S1}$ which prevails at such time will then vary in the following manner with respect to the noise level $\Delta V_{S0}$ in the state where the article is absent:

$$\Delta V_{S1} = \Delta V_{S0} V_1/V_0$$

Accordingly, to remove floor vibration noise from a scale cell under the load of an article, the noise level $\Delta V_D$ of the dummy cell should be corrected to $\Delta V_{S0} V_1/V_0$, and both noise levels should then be added in opposite-phase relation.

A preferred embodiment of the present invention will now be described in detail with reference to the drawings.

Figure 1:
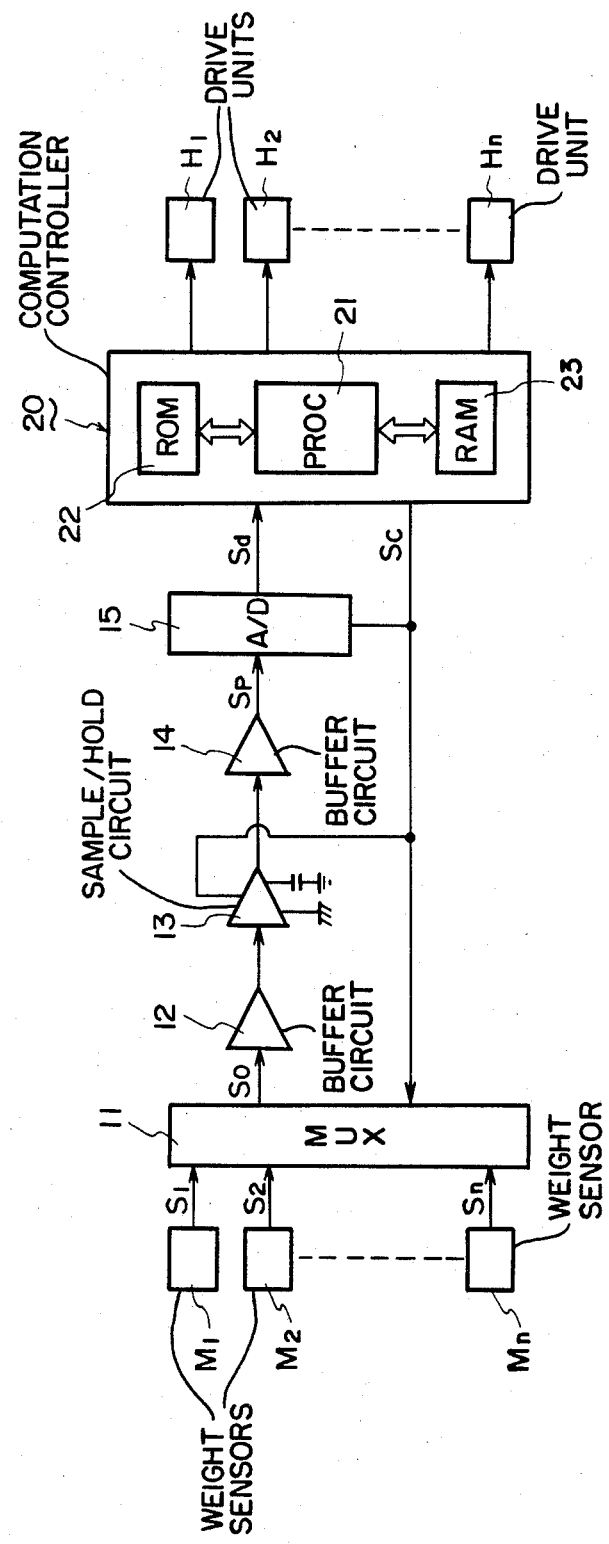
FIG. 1 is a block diagram of the general construction of a combinatorial weighing apparatus equipped with weight sensors.
Figure 2:
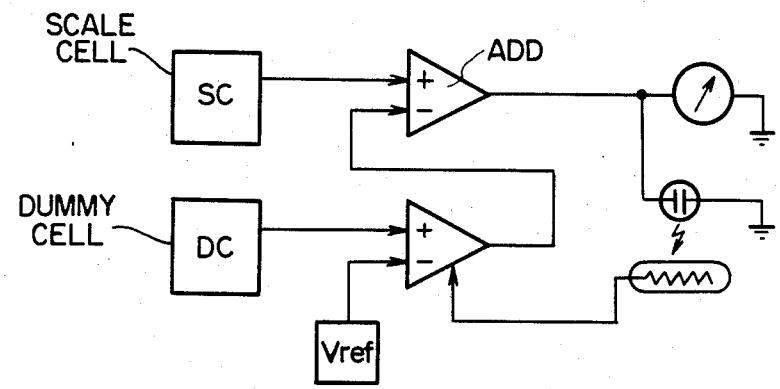
FIG. 2 is a circuit diagram of the general construction of a prior-art weight sensor using a dummy cell.
Figure 3:
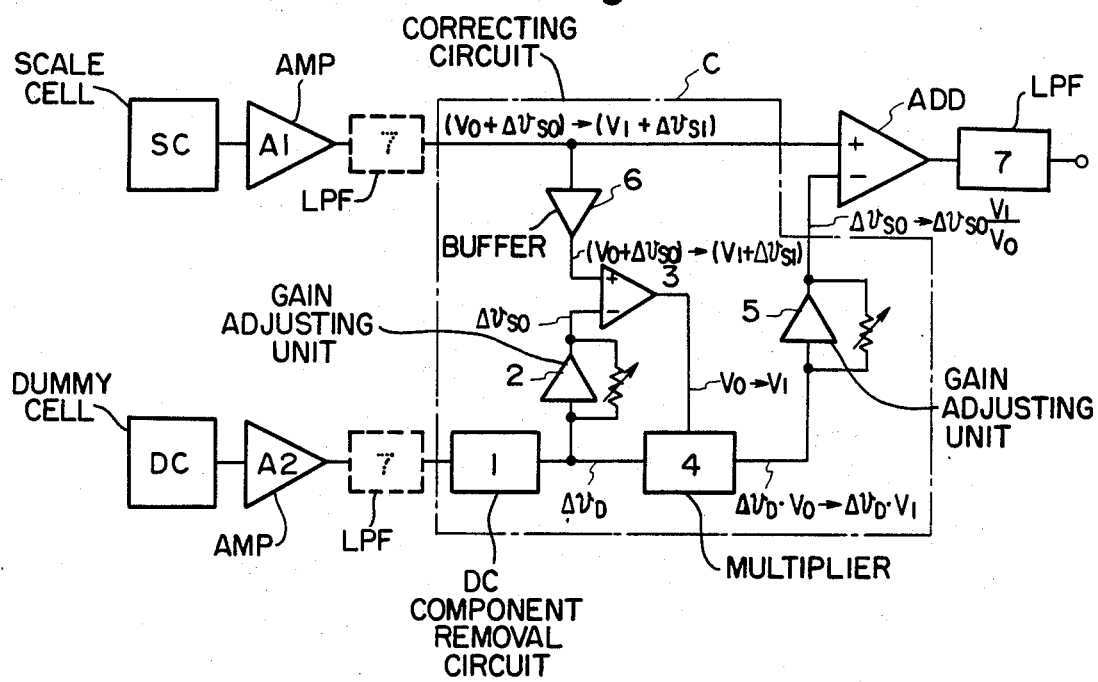
FIG. 3 is a block diagram of an embodiment of a weight sensor according to the present invention.

FIG. 3 is a block diagram illustrating a preferred embodiment of a weight sensor to which the above-described principle is applied. The weight sensor includes a scale cell SC, a dummy cell DC, an amplifier A1 for amplifying an output signal produced by the cale cell SC, an amplifier A2 for amplifying an output signal produced by the dummy cell DC, a correcting circuit C for correcting the output level of the dummy cell DC to $\Delta V_{S0} V_1/V_0$, and an adder ADD for adding, in opposite-phase relation, the output signal of the dummy cell DC and the output signal of the scale cell. The correcting circuit C comprises a DC component removal circuit 1 for extracting an AC component (noise signal), which is ascribable to floor vibration, from the output voltage of the dummy cell DC, a first gain adjusting unit 2 for establishing agreement between the noise level $\Delta V_{S0}$ of the scale cell SC and the noise level $\Delta V_{D0}$ of the dummy cell DC in the absence of the article to be weighed, an adding unit 3 for adding, in opposite-phase relation, the noise signal of the dummy cell DC corrected by the first gain adjusting unit 2 and the output signal of the scale cell SC to produce, as an output a DC component contained in the output signal of the scale cell SC, a multiplier 4 for multiplying the output signal of the adding unit 3 and the output signal of the DC component removal circuit 1, and a second gain adjusting unit 5 for bringing the output level of the multiplying unit 4 into agreement with the noise level of the scale cell SC. Where necessary, a buffer circuit 6 is inserted between the adding unit 3 and the scale cell SC.

The output of the adder circuit ADD is connected to a low-pass filter 7 for reducing vibration noise other than floor vibration, such as vibration noise of a somewhat higher frequency (high in comparison with the frequency of floor vibration noise) caused when an article to be weighed is placed in, e.g., a weighing dish or weighing hopper. Note that it is permissible to insert the low-pass filter 7 between the amplifiers A1, A2 and the correcting circuit C, as shown by the phantom lines in FIG. 3. In such case, however, it is necessary to make the constants of both filters identical in order to eliminate a phase shift.

Described next will be adjustments for each of the first and second gain adjusting units 2, 5, as well as a subsequent correction operation performed by the overall circuitry.

Adjustment of the gain adjusting units 2, 5 is performed in the following manner:

(1) First, in the absence of the article to be weighed, vibrations are set up simultaneously in the scale cell SC and dummy cell DC, and the amplifier gain of the first adjusting unit 2 is adjusted in such a manner that the prevailing noise levels $\Delta V_{S0}$, $\Delta V_D$ of the two cells are rendered equal. When this adjustment has been completed, the output produced by the adding unit 3 is the DC component $V_0$ (namely a DC voltage corresponding to the initial load of the empty weighing dish or weighing hopper) contained in the output signal of the scale cell SC the absence of the article to be weighed. Further, the output of the multiplying unit 4 is the product ($\Delta V_D \cdot V_0$) obtained by multiplying the DC component $V_0$ and the noise level $\Delta V_D$ of the dummy cell DC.

(2) Next, under the same conditions, the amplifier gain of the second gain adjusting unit 5 is adjusted to bring the output level thereof into agreement with the noise level $\Delta V_{S0}$ of the scale cell SC. When this adjustment has been completed, the amplification factor $\alpha$ of the second gain adjusting unit 5 will be as follows:

$$(V_0 \cdot \Delta V_{S0}) = \Delta V_{S0}$$

$$\therefore \alpha = \Delta V_{S0}/(V_0 \cdot \Delta V_D)$$

With the completion of the foregoing adjustments of the adjusting units 2, 5, a state is established in which floor vibration noise can be eliminated from the output signal of the scale cell SC.

More specifically, let us assume that applying the load of the article to be weighed causes the DC level of the scale cell SC to change from $V_0$ to $V_1$, and that, under the same vibration conditions, the noise level of the scale cell SC changes from $\Delta V_{S0}$ to $\Delta V_{S1}$. At such time the value $V_1 + \Delta V_{S1}$ enters the plus terminal of the adding unit 3. Further, since the vibration conditions are the same, a value equivalent to $\Delta V_{S0}$ enters the minus terminal of the adding unit 3. Therefore, the adding unit 3 performs the operation $(V_1 + \Delta V_{S1}) - \Delta V_{S0}$ to produce an output value equivalent to $V_1 + (\Delta V_{S1} - \Delta V_{S0})$. Here, $(\Delta V_{S1} - \Delta V_{S0})$ is very small in comparison with $V_1$ and therefore is substantially negligible. Accordingly, the inputs to the multiplying unit 4 are essentially $V_1$ and $\Delta V_D$, so that the product of $V_1 \cdot \Delta V_D$ is calculated thereby and applied to the second gain adjusting unit 5. Since the magnification factor $\alpha$ of the second gain adjusting unit 5 has been set to $\Delta V_{S0}/(V_0 \cdot \Delta V_D)$, however, the output value ($V_1 \cdot \Delta V_D$) of the multiplying unit 4 is multiplied by means of the adjusting unit 5, so that the output of the adjusting unit 5 is a value equivalent to the following:

$$\alpha \cdot (V_1 \cdot \Delta V_D) = (\Delta V_{S0}) \cdot [(V_1 \cdot \Delta V_D)/(V_0 \cdot \Delta V_D)] = \Delta V_{S0} \cdot (V_1/V_0)$$

This value is applied to the minus input terminal of the adder ADD.

Meanwhile, as set forth in the description of the principle of the invention, the noise level $\Delta V_{S1}$ of the scale cell SC takes on the value $\Delta V_{S0} \cdot (V_1/V_0)$ in response to application of the load of the article to be weighed. This value is applied to the plus terminal of the adder ADD. The adder ADD consequently produces an output signal from which floor vibration noise has been completely excluded. Moreover, since the correcting circuit C operates with almost no time delay, the floor vibration noise is cancelled out in rapid fashion.

FIG. 4 illustrates another embodiment of the present invention. Whereas the embodiment of FIG. 3 includes the correcting circuit C, which is provided with the multiplying unit 4 for multiplying the noise signal of the dummy cell and the DC component of the scale cell, and is so adapted as to bring the resulting product into agreement with the noise level of the scale cell, the embodiment of FIG. 4 dispenses with multiplying unit 4 and is arranged to eliminate the floor vibration noise of the scale cell by utilizing a digital circuit.

In FIG. 4, the weight sensor includes the scale cell SC, the dummy cell DC disposed close to the scale cell SC, the amplifier A1 for amplifying an output signal produced by the scale cell SC, an amplifier A2 for amplifying an output signal produced by the dummy cell DC, a low-pass filter LPF1 connected to the output of the amplifier A1, a high-pass filter HPF connected to the output of the amplifier A2, a low-pass filter LPF2 connected to the output of the high-pass filter HPF, and a correcting circuit C1 for correcting the output level of the dummy cell DC. The low-pass filters LPF1, LPF2 have identical filter constants so that their phases will agree. The scale cell SC produces an output signal of negative polarity which is directed through the amplifier A1 and low-pass filter LPF1. A signal which includes both a DC component and floor vibration noise is extracted at a point a, which is located at the output of the low-pass filter LPF1. The dummy cell DC produces an output signal of positive polarity which is directed through the amplifier A2, the high-pass filter HPF and the low-pass filter LPF2. A signal which includes floor vibration noise is extracted at a point b, which is located at the output of the low-pass filter LPF2. The negative-polarity output signal of the scale cell SC and the positive-polarity output signal of the dummy cell DC are applied to the minus input terminal of an adder ADD1, which is included in the correcting circuit C1. The adder ADD1 provides, at a point c at the output thereof, a DC component contained in the output signal of the scale cell SC. Connected to the plus input terminal of the adder ADD1 is a reference power supply $V_{0D}$ for cancelling the initial load, namely the weight of the empty weighing dish or weighing hopper. The output signal of the dummy cell DC enters the plus input terminal of an amplifier A3. Connected to the minus terminal of the amplifier A3 are a resistor $R_S$, a feedback resistor $Rf_o$ and, via switches SW1 through SW4, feedback resistors Rf1 through Rf4, respectively.

The signal at point c, namely the DC signal from the scale cell SC, is applied to a multiple-stage comparator MC for changing over the level of the feedback resistors in dependence upon the weight of the article being weighed. The multiple-stage comparator MC produces a signal for actuating the switches SW1 through SW4. If the potential at the point b is $V_d$, then an amplified signal, namely $V_d(1+R_f/R_s)$, will be obtained at the output side d of the amplifier A3. More specifically, the resistors $R_s$, $R_f$ are employed as gain adjusting resistors. It should be noted that $R_f$ represents feedback resistance which is varied by closing the switches SW1 through SW4. When the scale cell SC is free of the article to be weighed, all of the switches SW1–SW4 are open, i.e., off. Each time the weight is increased by a fixed amount, the switches are closed successively in the order SW1, SW2 . . . and so on. Specifically, the amplification factor of the output signal from the dummy cell DC is changed in dependence upon the weight of the article, so that a floor vibration noise signal from the dummy cell DC obtained at the point d is almost equal to the floor vibration component developed by the scale cell SC.

Figure 5:
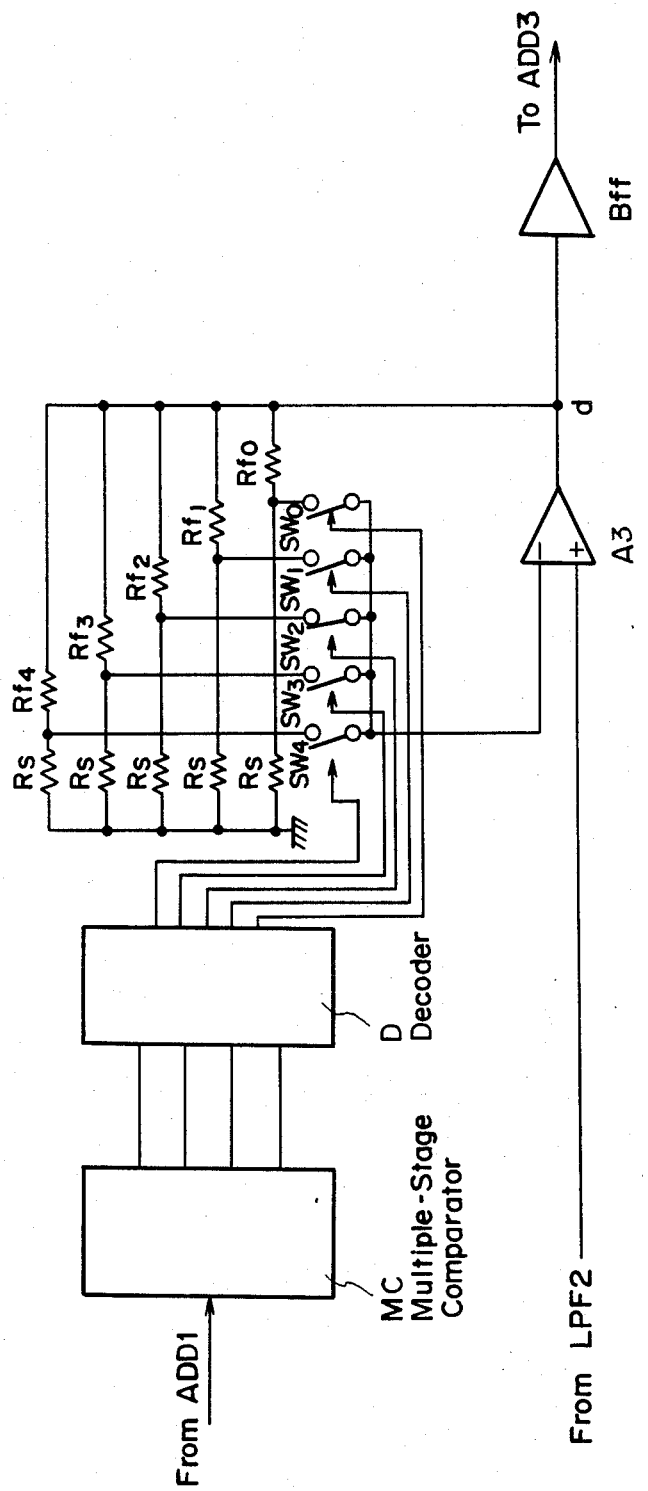
FIGS. 5 and 6 are partial circuit diagrams of different circuit configurations for changing the amplification factor of the amplifier A3 in the arrangement of FIG. 4A and FIG. 4B.
Figure 6:
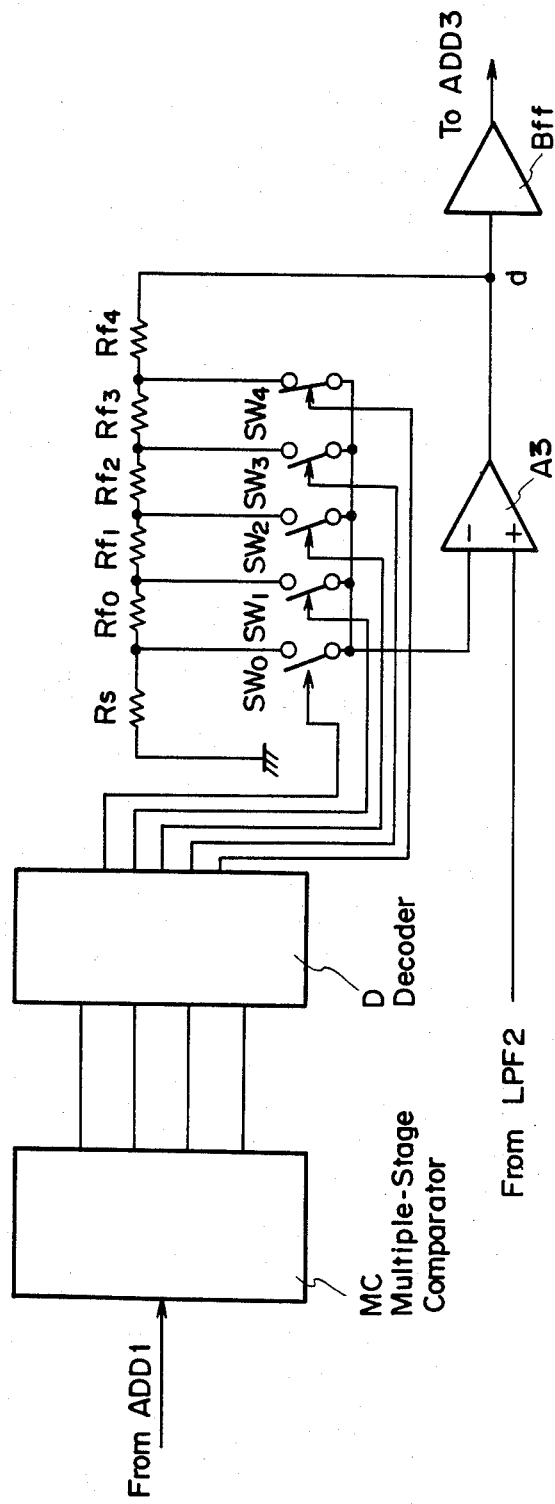

In the embodiment of FIG. 4, the arrangement is such that the switches SW1–SW4 are closed in successive fashion. Alternatively, however, as shown in FIGS. 5 and 6, a decoder D may be inserted between the multiple-stage comparator MC and switches SW0–SW4, so that the magnification factor of the amplifier A3 may be changed by closing any one of the switches SW0–SW4.

Figure 4A:
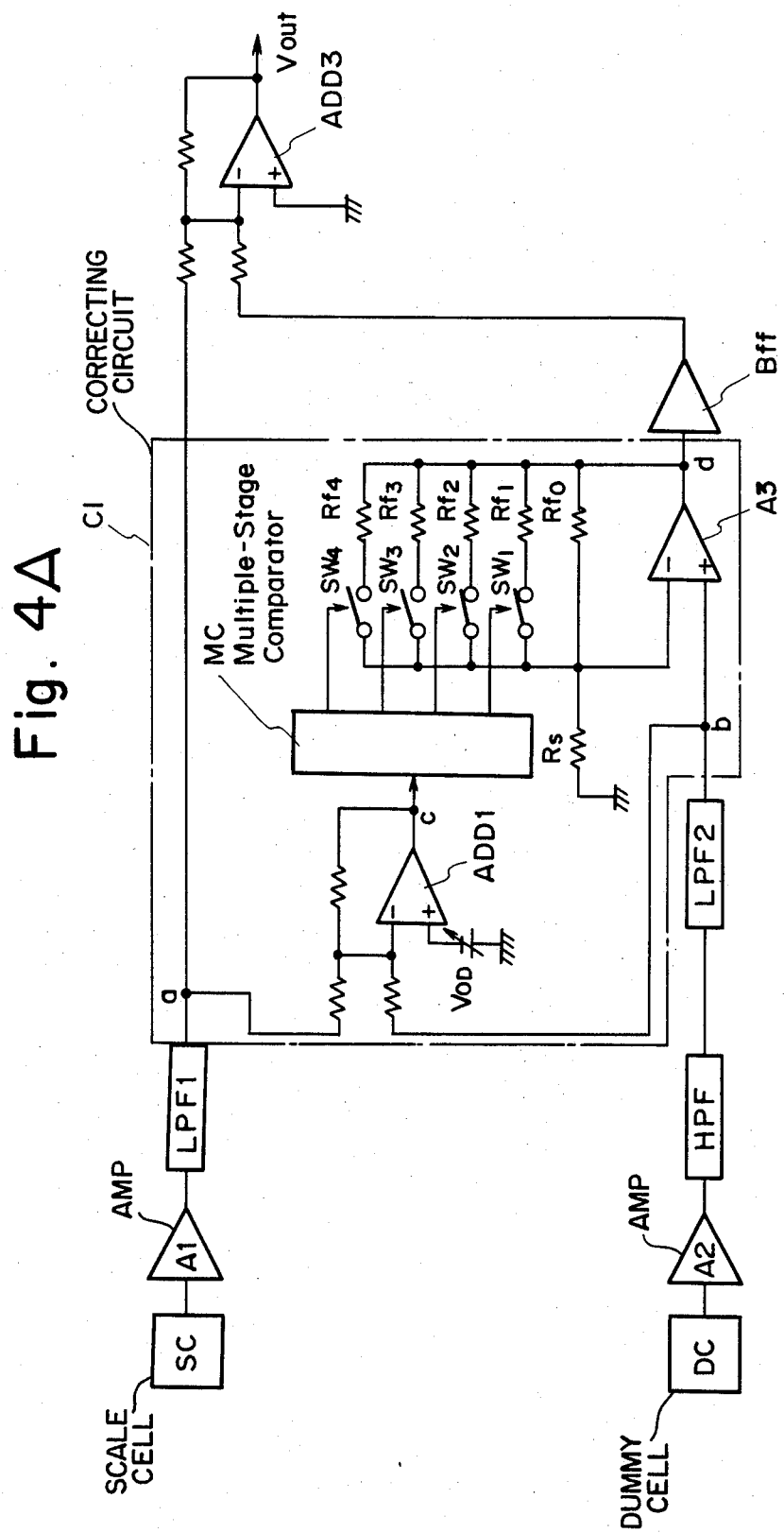
FIG. 4A is a block diagram of another embodiment of a weight sensor according to the present invention.
Figure 4B:
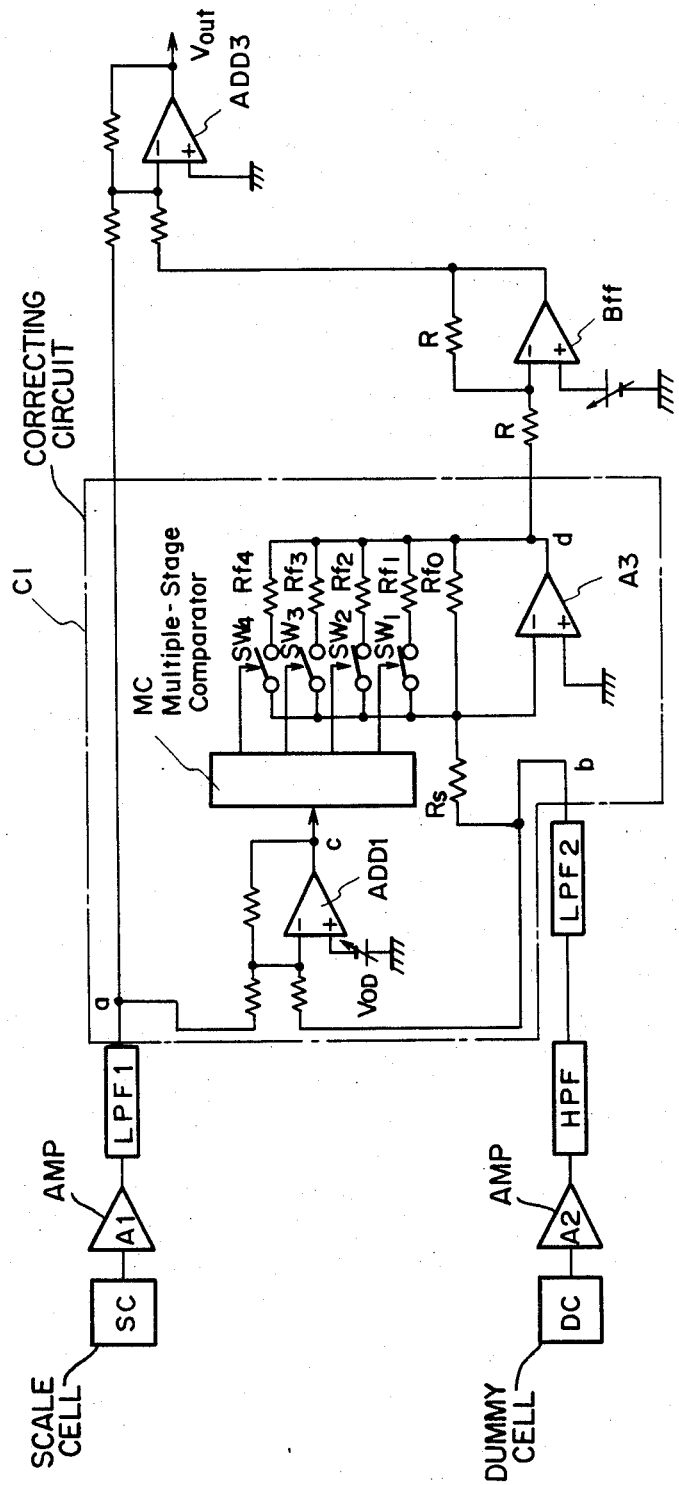
FIG. 4B is a block diagram of another embodiment of a weight sensor according to the present invention, in which an amplifier A3 and a buffer Bff include an inverted amplifying circuit.

Although the amplifier A3 and the buffer Bff in FIG. 4A include a non-inverted amplifying circuit they could include an inverted amplifying circuit as shown in FIG. 4B.

When a resistance connected between the output terminal of the low-pass filter LPF2 and the minus input terminal of the adder ADD1 is a variable resistor, so that a noise level of floor vibration delivered from the low-pass filter LPF2 agrees to a noise level of floor vibration delivered from the scale cell SC, both noise levels can be fine adjusted. This permits both noise levels of floor vibration to be perfectly deadened. Alternatively, the magnification factor of the amplifier A2 may be varied to get the same effect as above.

Likewise, when a resistance connected between the output terminal of the buffer Bff and the minus input terminal of the adder ADD3 is a variable resistance, the degree of freedom of the magnification factor of the amplifier A3 can be increased.

Returning to FIG. 4, the dummy cell output signal corrected by the correcting circuit C1 is applied to an adder ADD3 via a buffer Bff. The purpose of the buffer Bff is to compensate for any error voltage ascribable to an offset, or the like, contained in the output signal of the dummy cell DC. The output signal of the scale cell SC and the output signal of the dummy cell DC following its correction by the correcting circuit C1 are applied to the adder ADD3 in opposite-phase relation. As a result, the adder ADD3 produces an output signal $V_{out}$ which, in effect, is the output signal of the scale cell SC from which floor vibration noise has been excluded.

As many apparently widely different embodiments of the present invention can be made without departing from the spirit and scope thereof, it is to be understood that the invention is not limited to the specific embodiments thereof except as defined in the appended claims.

What we claim is:

1. A weight sensor comprising:
   a scale cell for producing an output signal corresponding to the weight of an article to be weighed, said output signal having a DC component and a floor vibration component;
   a dummy cell positioned adjacent said scale cell for producing a noise signal output ascribable to floor vibration;
   a correcting circuit, operatively connected to said scale cell and said dummy cell, for extracting a signal proporational to the DC component contained in the output signal of said scale cell and for correcting, on the basis of the extracted signal, the noise signal output of said dummy cell, so that the noise level of the corrected noise signal output corresponds to the noise level of the floor vibration component of said scale cell, said correcting circuit including:
   first gain adjusting means for establishing agreement between the noise level of the noise signal output of said dummy cell and the noise level of the floor vibration component of the output signal of said scale cell in the absence of the article to be weighed, and for providing an adjusted noise signal output;
   adding means for adding, in opposite-phase relation, the adjusted noise signal output of said dummy cell and the output signal of said scale cell, to produce, as an added output signal, the DC component contained in the output signal of said scale cell;
   multiplying means for multiplying the added output signal of said adding means and the noise signal output of said dummy cell to provide a multiplied output signal having an output level; and
   second gain adjusting means for generating the corrected noise signal output of said dummy cell by bringing the output level of said multiplying means into agreement with the noise level of the floor vibration component of said scale cell; and
   an adder, operatively connected to said scale cell and said second gain adjusting means, for adding, in opposite-phase relation, the corrected noise signal output of said dummy cell and the output signal of said scale cell.

2. A weight sensor comprising:
   a scale cell for producing an output signal corresponding to the weight of an article to be weighed, said output signal having a DC component and a floor vibration component,
   a dummy cell positioned adjacent said scale cell for producing a noise signal output ascribable to floor vibration;
   a correcting circuit, operatively connected to said scale cell and said dummy cell, for extracting a signal proportional to the DC component contained in the output signal of said scale cell and for correcting, on the basis of the extracted signal, the noise signal output of said dummy cell, so that the noise level of the corrected noise signal output corresponds to the noise level of the floor vibration component of said scale cell, said correcting circuit including:
   means for generating a signal proportional to the DC component contained in the output signal of said scale cell;
   a multiple-stage comparator, operatively connected to said generating means, for receiving the proportional signal and for determining the relative weight of the article to be weighed; and switching means for correcting the noise signal output of said dummy cell, said switching means including a gain adjusting resistor having a feedback resistance which varies in dependence upon the relative weight of the article to be weighed, as determined by said multiple-stage comparator; and an adder, operatively connected to said scale cell and said switching means, for adding, in opposite-phase relation, the corrected noise signal output of said dummy cell and the output signal of said scale cell.

3. A weight sensor comprising:

a scale cell for generating a first output signal corresponding to the weight of a quantity of product to be weighed, the first output signal having a DC component and a noise component which is caused by external noise;

a dummy cell positioned adjacent said scale cell, for generating a second output signal corresponding to the external noise;

a correcting circuit operatively connected to said scale cell and said dummy cell, said correcting circuit including:

means for extracting a signal proportional to the DC component contained in the first output signal, said extracting means including:

first gain adjusting means, operatively connected to said dummy cell, for receiving the second output signal and for providing an adjusted second output signal having a noise level which corresponds to the noise level of the noise component of the first output signal of said scale cell when the quantity of the product to be weighed is zero; and adding means, operatively connected to said scale cell and said first gain adjusting means, for adding, in opposite-phase relation, the first output signal and the adjusted second output signal, to produce, as an added output signal, the DC component contained in the first output signal; and means for correcting the second output signal on the basis of the extracted signal, so that the noise level of the corrected second output signal corresponds to the noise level of the noise component of the first output signal, said correcting means including:

multiplying means, operatively connected to said dummy cell and said adding means, for multiplying the added output signal and the second output signal to provide a multiplied output signal; and second gain adjusting means, operatively connected to said multiplying means, for receiving the multiplied output signal and for providing, as an output, the corrected second output signal by bringing the output level of the multiplied output signal into agreement with the noise level of the noise component of the first output signal of said scale cell; and an adder, operatively connected to said second gain adjusting means and said scale cell, for adding, in opposite-phase relation, the corrected second output signal of said dummy cell and the first output signal of said scale cell, to produce a corrected first output signal.

4. A weight sensor comprising:

a scale cell for generating a first output signal corresponding to the weight of a quantity of product to be weighed, the first output signal having a DC component and a noise component which is caused by external noise;

a dummy cell positioned adjacent said scale cell, for generating a second output signal corresponding to the external noise;

a correcting circuit operatively connected to said scale cell and said dummy cell, said correcting circuit including:

means for extracting a signal proportional to the DC component contained in the first output signal, said extracting means including means for generating a signal proportional to the DC component contained in the first output signal; and means for correcting the second output signal on the basis of the extracted signal, so that the noise level of the corrected second output signal corresponds to the noise level of the noise component of the first output signal, said correcting means including:

a multiple-stage comparator, operatively connected to said generating means, for receiving the proportional signal and for determining the relative weight of the quantity of product to be weighed; and switching means, operatively connected to said multiple-stage comparator, for providing the corrected second output signal, said switching means including a gain adjusting resistor having a feedback resistance which varies in dependence upon the relative weight of the quantity of product to be weighed, as determined by said multiple-stage comparator; and an adder, operatively connected to said switching means and said scale cell, for adding, in opposite-phase relation, the corrected second output signal of said dummy cell and the first output signal of said scale cell, to produce a corrected first output signal.

* * * * *